_United States Patent_ [19]

Inoue et al.

[11] Patent Number: 5,889,919
[45] Date of Patent: *Mar. 30, 1999

[54] COPY PROTECT RECORDING AND PLAYBACK SYSTEM THAT ENABLES SINGLE AUTHORIZED RECORDING OF PROTECTED BROADCASTS BE MADE

[75] Inventors: Hajime Inoue, San Jose; Chien-Chien Lee, Fremont, both of Calif.

[73] Assignees: Sony Electronics, Inc., Park Ridge, N.J.; Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 869,093

[22] Filed: Jun. 4, 1997

Related U.S. Application Data

[63] Continuation of Ser. No. 582,474, Jan. 3, 1996, abandoned.

[51] Int. Cl.[6] .................................................. H04N 5/91
[52] U.S. Cl. ............................ 386/94; 360/60; 380/5
[58] Field of Search ............................ 386/1, 94; 360/60; 380/5, 10, 22; H04N 5/76, 5/92, 5/91

[56] References Cited

U.S. PATENT DOCUMENTS

| 4,631,603 | 12/1986 | Ryan | 358/335 |
|---|---|---|---|
| 4,945,563 | 7/1990 | Horton et al. | 380/5 |
| 5,130,810 | 7/1992 | Ryan | 358/335 |
| 5,297,204 | 3/1994 | Levine | 380/10 |
| 5,418,853 | 5/1995 | Kanota et al. | 380/5 |
| 5,510,900 | 4/1996 | Shirochi et al. | 386/94 |
| 5,537,216 | 7/1996 | Yamashita et al. | 358/335 |
| 5,546,193 | 8/1996 | Hailey et al. | 358/335 |
| 5,627,655 | 5/1997 | Okamoto et al. | 386/94 |

FOREIGN PATENT DOCUMENTS

0581227 A   2/1994   Japan ................. H04N 5/92

*Primary Examiner*—Wendy Garber
*Assistant Examiner*—Vincent F. Boccio
*Attorney, Agent, or Firm*—Blakely, Sokoloff, Taylor & Zafman LLP

[57] ABSTRACT

A recording system that enables single authorized recordings of protected broadcasts be made. Subsequent unauthorized copies are prohibited by encoding a signal that causes the broadcast to be obscured during playback of the unauthorized copies. A broadcast is encoded to indicate that a single copy is authorized. If a copy is authorized, a control signal is input to the recording device wherein the signal is conditioned for recording and prior to placement of the conditioned signal on the recording medium the copy protect signal is encoded. Thus, if a second copy (which is unauthorized) is made, the copy protect signal will cause the recorded second copy to be obscured making the copy of little value to the unauthorized copier.

12 Claims, 3 Drawing Sheets

COPY PROTECT RECORDING AND PLAYBACK SYSTEM THAT ENABLES SINGLE AUTHORIZED RECORDING OF PROTECTED BROADCASTS BE MADE

This is a continuation of application Ser. No. 08/582,474, filed Jan. 3, 1996, now abandoned.

BACKGROUND OF THE INVENTION

1. Field of the Invention

The present invention relates to the recording of copy protected broadcast, more particularly, the present invention relates to the implementation of copied-once protection of broadcast.

2. Art Background

Today there is a number of different broadcast media in which users can view a variety of types of programming. Certain types of programming such as "Pay Per View" are typically a surcharge over what a user pays to receive a particular broadcast. An example of this is found in cable television as well as in satellite transmission broadcast (STB). To protect from unauthorized copying of certain programming, different techniques have been developed that encode information into the broadcast signal that enables a user to view the broadcast, but when an attempt is made to record the broadcast, the data is obscured.

FIG. 1 is a simplified block diagram of a conventional setup of a home system. The system includes a broadcast receiver, such as a television or satellite broadcast receiver shown. The receiver 10 typically includes circuitry 15 to perform some initial signal processing, such as a Domodulation, Error Correction, a decoder 20 to decode the transport layer of the broadcast data packet, circuitry 25 to decompress the video and a controller 30 to control the receiver. In addition, the receiver may include copy protect circuitry 35 that encodes a signal into the received broadcast such that the broadcast can be displayed by the display device 40 but not recorded. If the broadcast is recorded, the copy protect signal encoded into the broadcast causes the recorded broadcast signal to be corrupted. One example of a copy protect process is described in Ryan, U.S. Pat. No. 5,130,810.

A recording device, such as a video cassette recorder 45, is typically connected to the output of the receiver 10. As is well known in the art, the signal input to the recording device 45 is typically conditioned prior to recording on the recording medium. An automatic gain control process is performed by circuit 50 to place the video signal within acceptable signal ranges for recording. A circuit 52 is used to separate out the sync signals used to broadcast. Subsequently the luminance and chrominance are separated, circuit 55, for processing, circuits 60, 65, and recombined, circuit 70, for output to the recording medium 75.

It would be advantageous to provide the user the opportunity to select a one-time recording capability for a certain broadcast ("Pay-Per-Record"). This is envisioned to eliminate the need to travel to a store to purchase a video. Therefore, it is desirable to provide a one-time copy capability such that after the one copy is made, subsequent copies are prohibited.

SUMMARY OF THE INVENTION

The method and apparatus of the present invention provides a mechanism and process for implementing the same to enable single recordings of protected broadcasts be made. Subsequent unauthorized copies are prohibited by encoding a signal that causes the broadcast to be obscured during playback of the unauthorized copies. A broadcast is encoded to indicate that a single copy is authorized. If a copy is authorized, a control signal is input to the recording device wherein the signal is conditioned for recording and prior to placement of the conditioned signal on the recording medium the copy protect signal is encoded. Thus, if a second copy (which is unauthorized) is made, the copy protect signal will cause the recorded second copy to be obscured making the copy of little value to the unauthorized copier. However, subsequent playback of the first copy will produce a clear viewable signal as the copy protect signal does not affect the playback of the authorized copy.

It is contemplated that the mechanism is simple and inexpensive to implement. In one embodiment, a first switch controlled by the broadcast signal decoder is provided to prevent the broadcast signal from being input to the recorder if no copies are authorized. The decoder decodes a received broadcast signal and determines whether unlimited copies or single copy authorization is provided by the broadcast signal. If a single or unlimited copies authorization is provided, the broadcast signal is allowed to be input to the recording mechanism. Signal conditioning, such as automatic gain control, is then performed on the input signal. The luminance and chrominance signals are separated and the copy protect signal is encoded into the luminance signal if a single copy authorization was identified by the decoder. The copy protect signal permits the present authorized copy to be recorded, but prohibits subsequent copies to be made. If a user attempts to make a subsequent copy, that copy will be corrupted and playback will result in an obscured broadcast. However, the first recording of the broadcast can be played back subsequently to produce a clear picture of the broadcast as the copy protect signal does not affect subsequent playbacks of the first recorded broadcast.

BRIEF DESCRIPTION OF THE DRAWINGS

The objects, features and advantages of the present invention will be apparent to one skilled in the art in view of the following detailed description in which.

DETAILED DESCRIPTION

In the following description for purposes of explanation, numerous details are set forth in order to provide a thorough understanding of the present invention. However, it will be apparent to one skilled in the art that these specific details are not required in order to practice the present invention, and that in other instances well known electrical structures and circuits are shown in block diagram form in order not to obscure the present invention unnecessarily.

An innovative method and apparatus for permitting single copies of broadcasts to be recorded is described. The method and apparatus are described in the context of a digital broadcast service, such as a satellite transmission broadcast (STB) service. An example is the DIRECTV™ direct broadcast system (DBS). However, it is contemplated that this may be implemented in other types of broadcasts.

The process is described with reference to FIG. 2. At step 205, the broadcast signals are received. In the present embodiment broadcasts are received through a DBS receiver such as one manufacture by Sony Corporation. An initial decoding process, step 210, is performed. In the present embodiment, the transport layer of the packet received is decoded to retrieve the video data and audio data payloads stored within the packet. In addition, the present embodiment provides that the copy control signal is decoded at this time. Preferably, a copyright notification is placed in the header of the packet. Although the copy control signal is described as derived from the transport layer of the packet, it is contemplated that copy protection information can be conveyed separately through, for example, a coupled telephone line or a payment device.

At Step 215, if a recording is not to be performed, the copy protect signal is encoded into the audio/video data received, step 220, and the output is generated to a display device, step 225, such as a monitor for viewing of the broadcast by the user.

The copy protect signal protects against unauthorized copies; however, the copy protect signal does not affect the process of displaying the incoming broadcast. If a recording is to be made of the broadcast, step 215, the copy control signal must be looked at to determine if a copy is unauthorized, step 217. It is contemplated that three possible states may be identified by the copy control signal. First, no copies authorized; the second state is that one copy is authorized; and the third state is that unlimited copies are authorized. As noted previously, a single copy authorization enables a user to essentially purchase a video without leaving his home.

Figure 1:
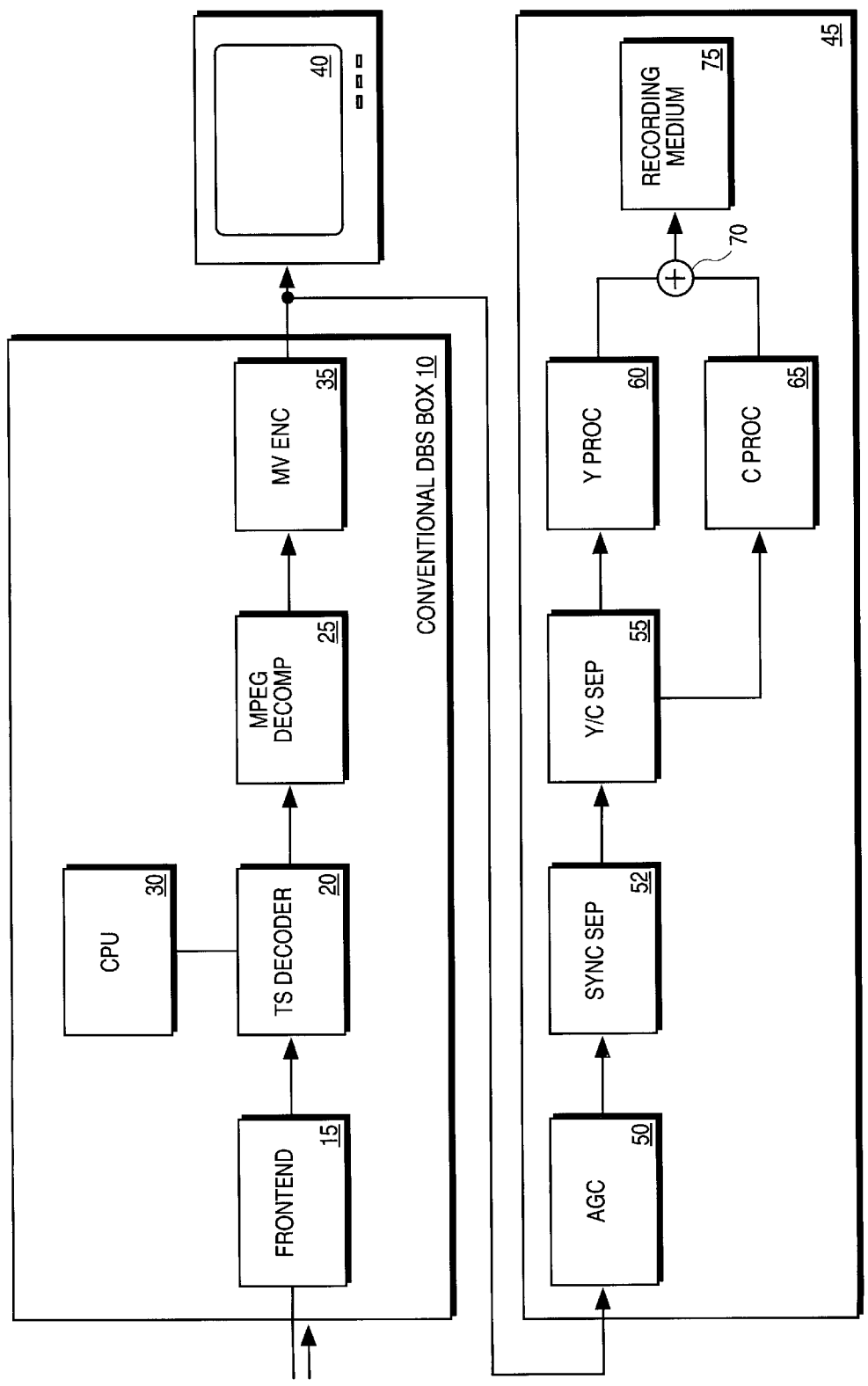
FIG. 1 is a simplified block diagram illustration of a prior art receiver and recording device.
Figure 2:
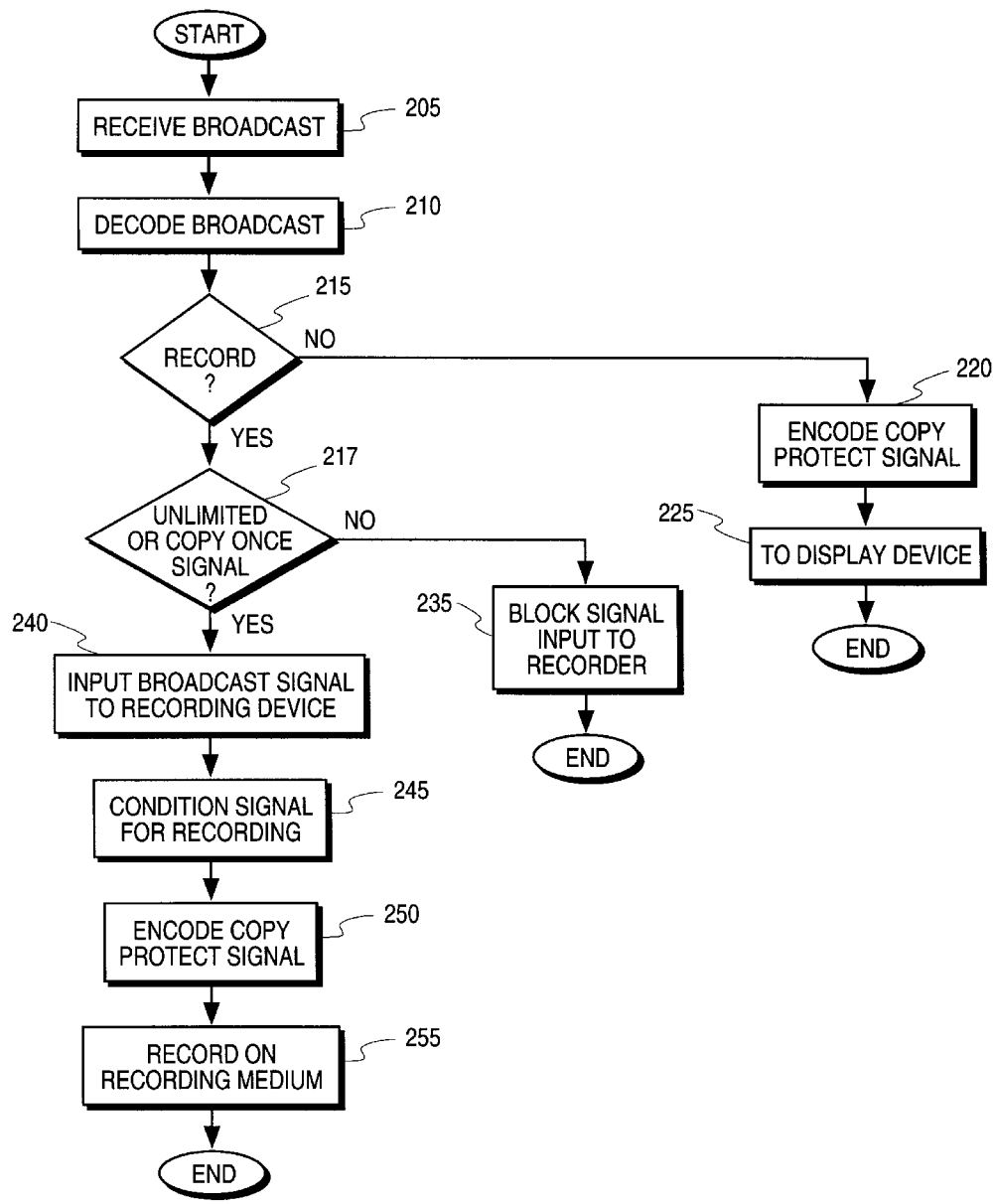
FIG. 2 is a flow chart illustrating one embodiment of the process performed to enable single authorized copies to be made.

Continuing reference to FIG. 2, if no copies are authorized, step 235, the input signal to the recorder is blocked, preventing unauthorized copies from being made. If a single copy or unlimited copies are authorized, at step 240, the broadcast signal is input to the recording device. The signal is then conditioned for recording, step 245. Immediately prior to recording the signal on the recording medium, such as a video cassette, the copy protect signal is encoded into the video stream, step 250. The video, with the encoded copy protect signal, is then recorded on the recording medium, step 255. As the copy protect signal operates to protect against unauthorized copies by encoding the signal with information such that when the signal is conditioned prior to recording, the signal is corrupted, placement of the copy protect signal after a signal conditioning, but prior to placement on the recording medium, does not affect the recorded signal. Therefore, playback of the recorded broadcast is possible. However, if the user attempts to make a second copy off of the recorded medium, the copy protect signal would function to prohibit a coherent copy from being made. For further information regarding an example of generation of the copy protect signal see Ryan, U.S. Pat. No. 5,130,810.

Figure 3:
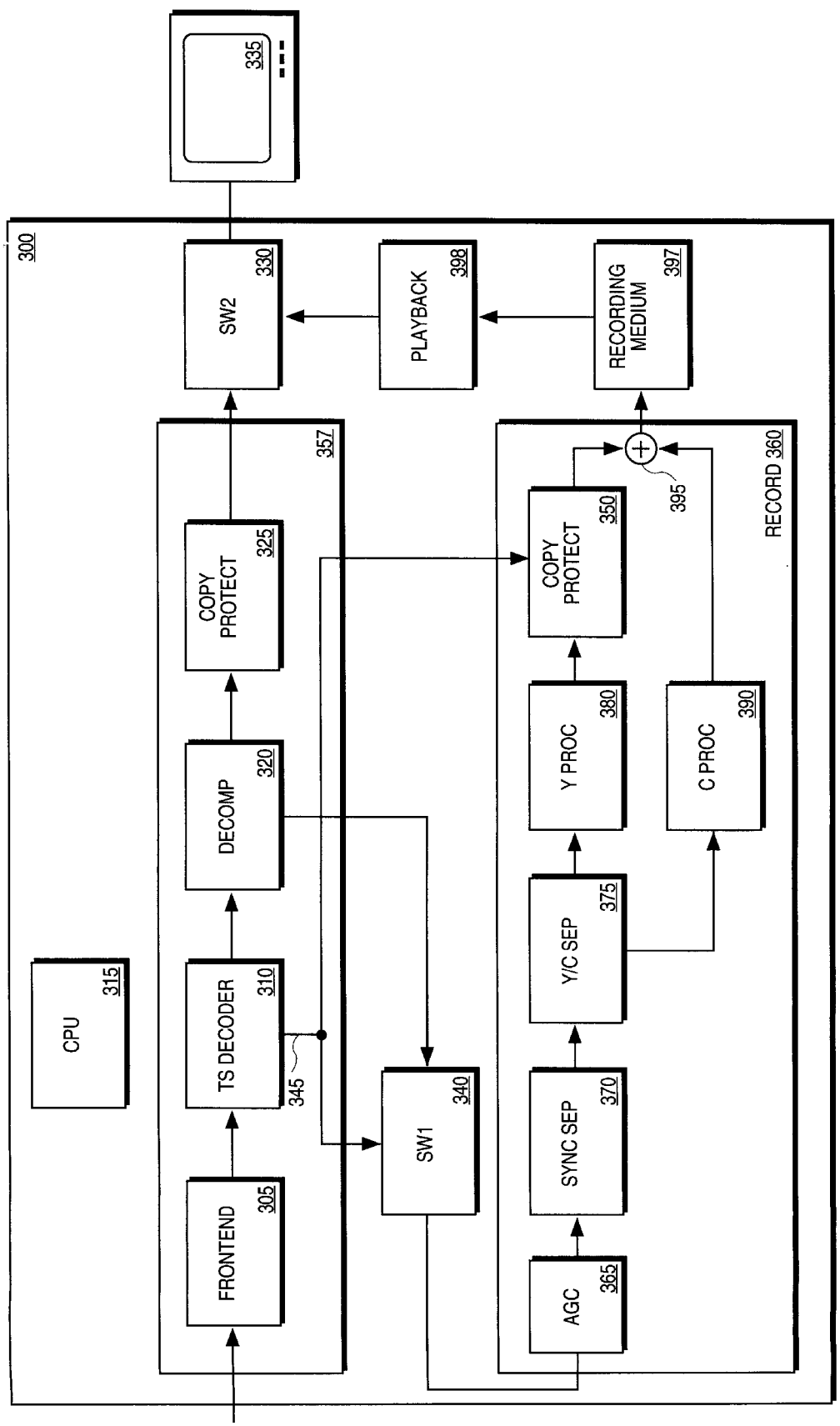
FIG. 3 is a simplified block diagram of the receiver and recording device in accordance with the teachings of the present invention.

An exemplary device in accordance with the teachings of the present invention is illustrated in FIG. 3. The device is shown as a single unit 300, which can be generally described as including receiver circuitry 357 and recording circuitry 360. However, it is contemplated that the circuitry may be embodied in multiple units. The broadcast signal is received through the front-end circuitry 305, which performs some initial signal processing of the received direct broadcast signal (DBS). The decoder 310, decodes the transport layer and determines the copy protection on the broadcast received. CPU 315 functions to control the circuitry of the receiver circuitry 357, recorder circuitry 360 and other elements, including control of authorization of viewing and recording.

The audio/video data output by the transport layer decoder 310 is output to decompression circuitry 320. In the present embodiment, this circuitry operates according to the moving pictures expert group (MPEG) standard. However, other video compression techniques can be utilized. Once decompressed, the data is forwarded to copy protect circuitry 325, which encodes the copy protect signal into the broadcast signal. Thus, any recordings of the signal after processing through the copy protect circuitry 325 result in recorded broadcast that is obscured. The signals are then output through switch 330 to the monitor or display device 335.

The output of the decompression circuitry 320 also input to a first switch 340. The opening and closure of the switch is controlled by the copy control signal output by the decoder 310. The signal is output along line 345, and is input through switch 340 and copy protect circuitry 350.

A copy control signal received on line 345 can be in one of three states to indicate, 1) that no copies are permitted, 2) that unlimited copies are permitted, or 3) a single copy of the broadcast is permitted. If no copies of the broadcast are permitted, the switch 340 remains open to block the signal from being input to the recording circuitry 360. If, however, the copy control signal indicates that a single or unlimited copies are permitted, the decompressed signals are input to the recording circuitry 360. Automatic gain control is performed by subcircuit 365 to adjust the video signals to proper signal levels for recording. The sync signals are then separated out by circuitry 370, and the luminance and chrominance signals are separated for processing by circuitry 375, 380, 390.

The copy protect circuitry 350 processes the luminance portion of the video to encode the copy protect signal. Although the present embodiment processes the luminance signal, the copy protect circuitry could alternately be placed to process the chrominance signal output by chrominance circuit 390 or process both the luminance and chrominance signals concurrently.

The copy protect circuitry 350 is controlled by copy control signal output along line 345. If unlimited copies are provided for, copy protect circuitry will simply let the luminance signal pass through to summing circuitry 395 for output to the recording medium 397. However, if a single copy is authorized, the copy protect circuitry encodes the luminance signal with a copy protect signal that prohibits subsequent copies from being made.

As noted previously, the copy protect signal does not prohibit replay of the broadcast recorded on medium 397. Thus, the device 300 can include playback circuitry 398 known to those skilled in the art to play back the recorded broadcast. This is input to switch 330 which enables the broadcast to be displayed, originating either from the playback mechanism 398 or the broadcast signal received through front end 305 and processed through decoder 310, decompressor 320, and copy protect circuitry 325.

It can be seen that if a user attempts to make a copy, for example by connecting a recording device to the output of switch 330, the copy made would be obscured due to the copy protect signal encoded into the video. A single copy is permitted as the copy protect signal is not encoded into the data in the recorder until after the automatic gain control circuitry 365 has processed the incoming data. In the present embodiment, the copy protect signal causes corruption of the video data when processed through automatic gain control circuitry 365. However, it is contemplated that copy protect signal can be configured differently to react in a similar manner with other portions of the recording circuitry in order to provide the same result and effect of selectively prohibiting and enabling recordings of broadcasts to be made.

The invention has been described in conjunction with the preferred embodiment. It is evident that numerous alternatives, modifications, variations and uses will be apparent to those skilled in the art in light of the foregoing description.

What is claimed is:

1. A recording mechanism for selectively enabling a single authorized copy of a broadcast comprising:

a receiving device for receiving a broadcast signal;

a decoder for decoding the broadcast signal received to determine a copy protection on the broadcast signal, said decoder automatically causing the issuance of a copy control signal;

a first switch coupled to receive the broadcast signal from the decoder;

a recorder coupled to receive the broadcast signal from the first switch, the recorder for recording the broadcast signal on a recording medium, said recorder comprising a plurality of elements to condition the broadcast signal for copying onto the recording medium, said plurality of elements including, a first element which outputs an obscured broadcast signal if a copy protect signal has been placed in the broadcast signal; and a first copy protect generator coupled between the first element and the recording medium, the first copy protect generator further coupled to the decoder to receive the copy control signal such that the first copy protect generator places a copy protect signal in the broadcast signal to prevent additional recordings if the copy control signal indicates that one recording is permitted;

wherein the first switch is responsive to the copy control signal such that if the copy control signal indicates that at least one copy of the broadcast is permitted, the first switch allows the broadcast signal to be transmitted from the receiving device to the recorder else, the first switch prevents the transmission of the broadcast signal from the receiving device to the recorder.

2. The recording mechanism as set froth in claim 1, further comprising a second copy protect generator coupled between the decoder and a display device for automatically placing a copy protect signal in the broadcast signal to prevent recording of the broadcast; and a second switch coupled to selectively receive the broadcast signal from the second copy protect generator and a replay of a recorded broadcast signal from the recorder and output a display signal to the display device.

3. The recording mechanism as set forth in claim 1, wherein said broadcast signal comprises a transport layer, said transport layer comprising indicia that no recordings, one recording or unlimited recordings of the broadcast can be performed.

4. The recording mechanism as set forth in claim 3, wherein the decoder comprises a transport layer decoder.

5. The recording mechanism as set forth in claim 1, wherein the recorder comprises a video cassette recorder (VCR).

6. The recording mechanism as set forth in claim 1, wherein the first element comprises an automatic gain control circuit.

7. The recording mechanism as set forth in claim 1, wherein the broadcast signal is a digital broadcast signal.

8. A method for selectively enabling a single authorized copy of a broadcast comprising the steps of:

receiving a broadcast signal in a receiving circuit;

decoding the broadcast signal received to determine a copy protection on the broadcast, including automatically causing the issuance of a copy control signal;

transmitting the copy control signal to a switch;

the switch selectively blocking the decoded broadcast signal from entering a recording circuit if the copy control signal transmitted to the switch indicates that no recording of the broadcast is permitted;

recording the broadcast signal on a recording medium, comprising the steps of, conditioning the decoded broadcast signal for recording;

the recording circuit receiving the copy control signal in a copy protect element of the recording circuit;

the copy protect element of the recording circuit placing a copy protect signal in the conditioned broadcast signal to prevent additional recording if the copy control signal indicates that one recording is permitted; and placing the conditioned, broadcast signal with the copy protect signal on the recording medium, wherein said step of conditioning the decoded broadcast signal causes the conditioned broadcast signal to be obscured if a copy protect signal is in place.

9. The method as set forth in claim 8, further comprising the steps of:

if the decoded broadcast signal is to be output directly to a display device, transmitting the decoded broadcast signal with the copy protect signal to a copy protect element of the receiving circuit; and the copy control element of the receiving circuit placing a copy protect signal in the broadcast signal to prevent recording of the broadcast signal.

10. The method as set forth in claim 8, wherein the step of decoding decodes a transport layer of the broadcast signal, said transport layer comprising indicia that no recordings, one recording or unlimited recordings of the broadcast can be performed.

11. The method as set forth in claim 8, wherein the step of conditioning the decoded broadcast signal comprises the step of performing automatic gain control on the decoded broadcast signal.

12. The method as set forth in claim 8, wherein the step of receiving broadcast signals comprises the step of receiving digital broadcast signals.

* * * * *